May 19, 1959   R. ADELL   2,887,338
TRIM MOLDING FOR CURVED VEHICLE DOOR OUTER EDGES
Filed Nov. 18, 1954   2 Sheets-Sheet 1
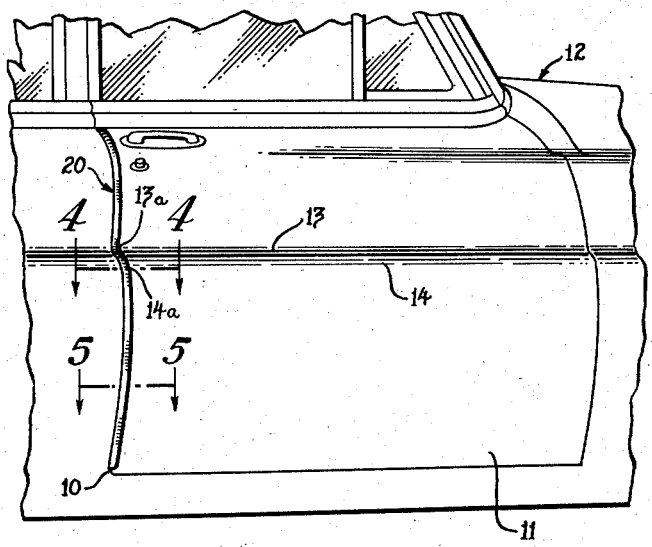
Fig.1
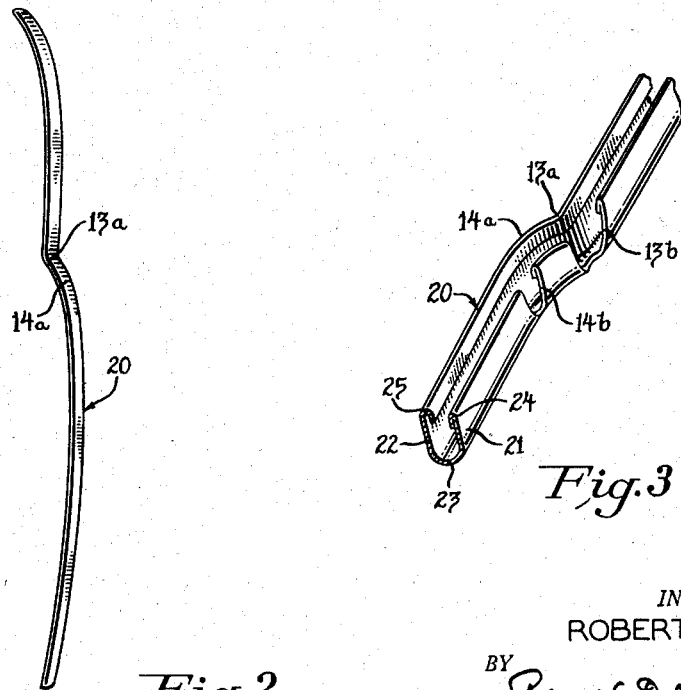
Fig.2
Fig.3
INVENTOR.
ROBERT ADELL
BY Gregory S. Dolgorukov
ATTORNEY.

May 19, 1959   R. ADELL   2,887,338
TRIM MOLDING FOR CURVED VEHICLE DOOR OUTER EDGES
Filed Nov. 18, 1954   2 Sheets-Sheet 2

INVENTOR.
ROBERT ADELL
BY Gregory S. Dolgorukov
ATTORNEY.

United States Patent Office 2,887,338
Patented May 19, 1959

2,887,338

TRIM MOLDING FOR CURVED VEHICLE DOOR OUTER EDGES

Robert Adell, Detroit, Mich., assignor to Franklin Z. Adell and Marvin M. Adell, both of Detroit, Mich.

Application November 18, 1954, Serial No. 469,785

6 Claims. (Cl. 296—44)

This invention relates to motor vehicles and more particularly to such vehicles in which the trailing edges of the swinging closures thereof, such as doors, are protected by ornamental and protective molding. The present application is an improvement over my co-pending applications Serial No. 280,297, filed on April 3, 1952, and now abandoned, for Trim Molding; and, Serial No. 328,065, filed on December 26, 1952, now Patent No. 2,856,228, for Automobile Body Construction.

Provision of protective and ornamental molding on the trailing edges of motor vehicle doors, as disclosed in my said co-pending applications, while being of great advantage and value, nevertheless, presents a number of serious problems. One of such problems is found in fitting such molding to the trailing edges of doors which have such configuration of their outer surfaces that the trailing edge to which such molding has to be fitted has a number of relatively sharp curves or bends directed both inwardly and outwardly of the vehicle. It should be appreciated that the ornamental molding of the nature disclosed in my said co-pending applications is relatively narrow and may have width of only 1/4 of an inch. Yet, in spite of such width, the molding must embrace the edge of the door and be retained thereon in a manner that would prevent loosening and falling off of the molding due to road rumble and jars which the motor vehicle carrying them may receive in practical operation or produced by slamming the doors in closing the same. When it is attempted to fit a molding of this nature to an edge of a door having such sharp bends, forming such a molding becomes exceedingly difficult and usually results in distorting the molding and causing folds of metal in some places as well as distortion of the cross section of the molding.

It has also been found that the trailing door edges themselves possess certain irregularities at such bends, such as folds on the inner surface of the door at the edges thereof, causing such edges to have irregular thickness, making fitting ornamental and protective molding to such edges very difficult and often impractical.

One of the objects of the present invention is to provide an improved ornamental and protective molding for trailing edges of motor vehicle doors, and a method of making the same, whereby the above difficulties and disadvantages are overcome and largely eliminated.

Another object of the present invention is to provide an improved ornamental and protective molding for trailing edges of motor vehicle doors, said molding being of such a construction as to fully enclose and protect the trailing edge of the door to which it is applied and yet be susceptible of application to edges having relatively sharp or abrupt bends or curvature as well as uneven thickness resulting therefrom.

A further object of the present invention is to provide an improved ornamental and protective molding for trailing edges of motor vehicles, which molding has a construction making it susceptible of being manufactured in accordance with an improved method hereinafter disclosed.

A still further object of the present invention is to provide a molding of the foregoing character which is retained in place in a secure and dependable manner.

A still further object of the present invention is to provide an improved molding of the foregoing nature, which is simple and rugged in construction, dependable in use, and is relatively inexpensive to manufacture.

A still further object of the present invention is to provide an improved method of manufacturing molding of the nature specified above.

Further objects and advantages of this invention will be apparent from the following description and appended claims, reference being had to the accompanying drawings forming a part of this specification, wherein like reference characters designate corresponding parts in the several views.

Fig. 1 is a fragmentary perspective view showing a portion of an automobile having a swinging door with the ornamental and protective molding embodying the present invention provided on the trailing edge of said door.

Fig. 2 is a perspective view showing the ornamental and protective molding separately and on a larger scale.

Fig. 3 is a fragmentary perspective view showing on an enlarged scale the middle portion of the molding of Fig. 2, the observer looking on the inner side of the molding.

Figure 4:
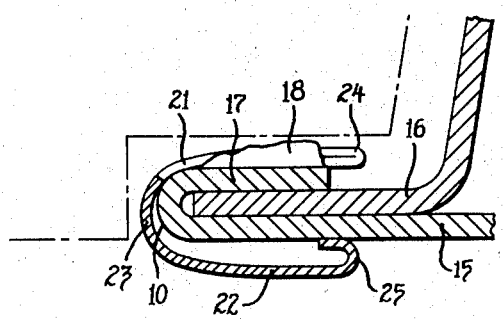
Fig. 4 is a fragmentary sectional view taken in the direction of the arrows on the section plane passing through line 4—4 of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention I provide an ornamental and protective molding for the trailing edges of the doors and other closures of an automobile, which molding has a generally U-shape cross section and is adapted to embrace such edge and to be retained thereon. In places of bends, the middle of the molding is cut out or notched out from its edge toward its middle to prevent formation of folds or collapsing of the cross section of the molding and to accommodate the folds that may occur on the trailing edge itself at the places where molding has to fit.

In accordance with the method herein disclosed, the molding of the above described nature is manufactured by notching out the metal at the inner leg of the U-cross section of the molding strip after it is bent to the U-shape but before it is bent longitudinally to conform to the longitudinal outline or configuration of the trailing edge. Thereupon, the molding is filled with a suitable filler and is bent in suitable apparatuses, such as dies or a bending machine.

Referring to the drawings there is shown therein, by way of example, an improved ornamental and protective molding embodying the present invention. The molding is shown as applied to the trailing edge 10 of the front door 11 of a motor vehicle generally designated by the numeral 12. It will be understood that while the invention is hereinafter illustrated and described as applied to the trailing edge of a swinging door, it is applicable with equal success to the edges of other swinging closures of an automobile, such as rear compartment lid or engine hood, as well as to trailing edges of doors and other closures of the sliding rather than swinging type.

Figure 5:
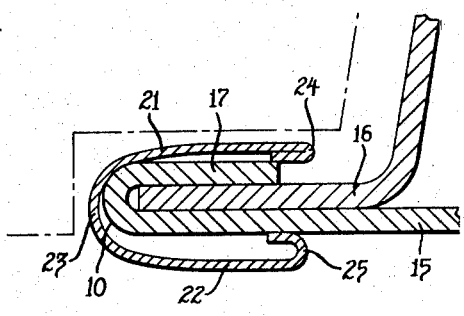
Fig. 5 is a fragmentary sectional view taken in the direction of the arrows on the section plane passing through the line 5—5 of Fig. 1.

The door 11 shown in Fig. 1 has an outside configuration of such a nature as to form relatively sharp or abrupt bends along its trailing edge. In the embodiment illustrated in the drawing there is thus formed on the door surface an inwardly directed bend 13 and an outwardly directed bend 14, which bends appear also in the molding and are best shown in Fig. 2 as bends 13a and 14a. It will be understood that in forming the trailing edges of the door, the outer sheet 15 may be bent over the inner sheet 14 to form a flange 17, as shown in Figs. 4 and 5. Even with the thickness of the sheet metal presumed to be the same, which is not always the case in actual practice, formation of the bend 14 on the door edge results in folds 18 extending inwardly of the vehicle for a considerable distance and preventing application of the ornamental molding to the door edge without distorting cross section of such molding and thus affecting both its appearance as well as edge-gripping characteristics.

The molding, generally indicated by the numeral 20, is of a generally U-shaped cross section including an inner leg 21 and an outer leg 22, said legs being connected together by a curved portion 23. The edges of the molding at the ends of its legs 21 and 22 are bent upon themselves as illustrated at 24 and 25, respectively. It should be noted, however, that while the bent edge 24 is compressed to bring its inner surfaces into contact, the edge 25 has predetermined radius at its inner surfaces, such as 1/64 of an inch. By the use of the above expedient a surprisingly effective facilitating of bending or forming the molding longitudinally is attained.

As is best shown in Fig. 3, the material of the leg 21 of the molding is cut out or notched opposite the bends 13a and 14a, as illustrated at 13b and 14b. It should be appreciated that such cutting or notching should not remove more than one-half of the connecting portion 23. In fact, it is preferred to remove considerably less than one-half of such portion 23, in order to ensure that the trailing edge of the door is fully enclosed or covered by the remainder of the portion 23 when the door is closed. Such a condition is shown in Fig. 4.

It should also be appreciated, however, that should the entire portion 23 be left intact, difficulties may be experienced under some conditions in forming the molding at such bends and, therefore, how much of the portion 23 and of the leg 21 has to be removed depends on the sharpness of the curvature of the bends, nature and heat treatment of the material of the molding, as well as on the forming dies, and this question may be determined experimentally. Generally, it is desirable to remove the least amount of material that would eliminate the disadvantages explained above.

Figure 6:
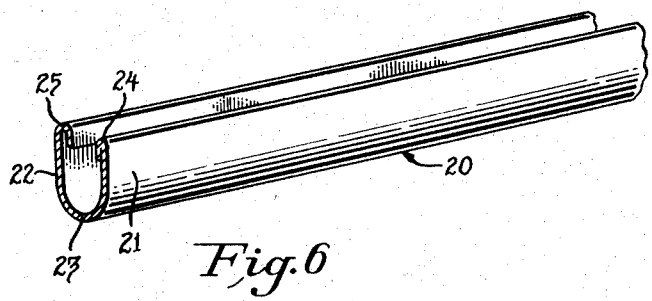
Figs. 6, 7 and 8 illustrate successive steps of manufacturing my improved molding disclosed herein.
Figure 7:
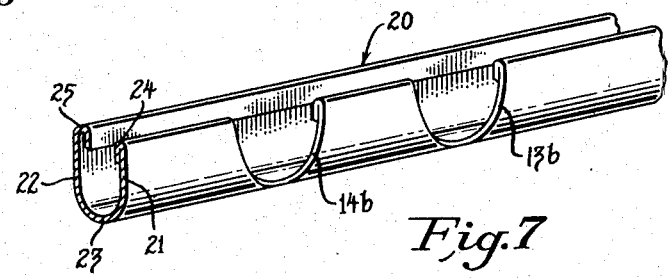
Figure 8:
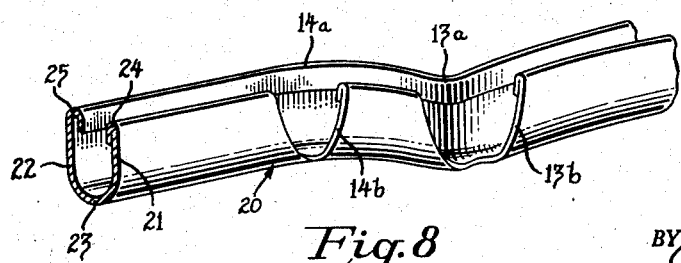

Figs. 6, 7, and 8 illustrate successive steps of an improved method of manufacturing the molding disclosed above. In accordance with my improved method I provide a strip of suitable material and bend the same to a generally U-shape as shown in Fig. 6, bending of the edges of the molding inwardly of themselves. The edge 24 may be fully compressed, while the outer edge 25 is bent on a predetermined radius such as 1/64–1/32 of an inch. Thereupon, the material of the molding is cut out or notched in any suitable manner, such as in a suitable die apparatus, to remove metal at places opposite the intended bends, irrespective of direction of such bends, be it inward, outward or in the general plane of the door. The molding of Fig. 7 represents the molding of Fig. 6 after the notching operation is completed. The corners of the molding at the notches may be rounded in order to prevent formation of sharp burrs thereat.

Thereupon, the molding, which is in the shape illustrated in Fig. 7, is bent to desired longitudinal curvature or outline conforming to that of the door edge 10. Such bending may be done in suitable dies with or without filling the molding to prevent its collapse in the process of bending. It will be noted from an examination of Fig. 8 that the recess 13b "opened up" or became wider after such bending, thus compensating for the lack of material in stretching of the inner wall 21 opposite the bend 13a of the outer wall 22 which lack unless compensated for would produce tension in said inner wall opposite bend 13a and would cause the inner wall 21 to move toward the wall 22 and thus distort the predetermined cross section of the molding. On the other hand, the recess 14 partly "closed up" or became narrower whereby formation of folds in the inner wall 21 opposite bend 14a of the outer wall 22, is prevented.

The molding constructed in accordance with the present invention may be connected to the trailing edge of the door in any desired manner, such for instance, as with the use of adjustable brackets or compensating clips such as disclosed in my Patents Nos. 2,685,472 and 2,685,473, respectively.

There is thus provided an improved ornamental and protective molding for trailing edges of motor vehicle doors and a method of making the same, whereby the objects of the present invention listed above and numerous additional advantages are attained.

I claim:

1. In an automobile body including a door having configuration resulting in the trailing edge of the door having outline with at least one bend of sharper curvature than the general curvature of said edge; an ornamental and edge-protecting molding provided at least along a portion of said trailing edge which includes said bends and having longitudinal outline conforming to the outline of said portion, said molding comprising a strip of sheet metal having a generally U-shape cross section, the legs of said cross section being of substantially equal length, and fitted over said trailing edge to embrace and cover the same, the metal of said molding at the inner leg of its U-shape cross section being notched substantially in the middle portions of said bends, said notches extending from the end of the inner leg of the cross section to its connecting portion and terminating before reaching the middle of the curved connecting portion of the U.

2. In an automobile including a door having configuration of its outer surfaces resulting in a plurality of bends of sharper curvature than the general curvature of said edge, said respective bends having curvature in opposite directions; an ornametal and edge-protecting molding provided at least along a portion of said trailing edge, which includes said bends nad having its longitudinal outline conforming to the outline of said portion, said molding comprising a strip of sheet metal having a generally U-shape cross section, the legs of said cross section being of substantially equal length, and fitted over said trailing edge to embrace and cover the same, the metal of said molding at the inner leg of its U-shape cross section being notched substantially in the middle portions of said bends, said notches extending from the inner edge of the molding toward the middle of the curved portion of its U-shape cross section but terminating before reaching the middle thereof.

3. In a method of producing ornamental and protective molding for the trailing edge of automobile door, with said molding including bends of sharper curvature than the general curvature thereof thereby tending to produce folds in the metal and to draw together the walls of the molding at said bends in forming thereof; said method including the steps of providing a strip of metal bent to a U-shape cross section, the legs of said cross section being of substantially equal length, notching out the metal of the inner leg of the cross section substantially at the middle portions of said bends filling the molding with filler, and thereupon forming the molding to the desired longitudinal outline.

4. In a method of producing ornamental and protective molding for the trailing edge of automobile door, with said molding including bends of sharper curvature than the general curvature thereof thereby tending to produce folds in the metal and to draw together the walls of the molding at said bends in forming thereof; said method including the steps of providing a strip of metal bent to a U-shape cross section, the legs of said cross section being of substantially equal length, bending at least one of the longitudinal edges of the strip upon itself upon a predetermined radius larger than that at which the bent over edge comes in contact with the body of the molding.

5. The invention defined in claim 3, and including, before forming the molding to longitudinal outline, the step of bending at least one of the longitudinal edges of the strip upon itself upon a predetermined radius larger than that at which the bent over edge comes in contact with the body of the molding.

6. In an automobile body including a door configuration resulting in the trailing edge of the door having outline with at least one bend of sharper curvature than the general curvature of said edge; an ornamental and edge-protecting moulding provided at least along a portion of said trailing edge which includes said bends and having longitudinal outline conforming to the outline of said portion, said moulding comprising a strip of sheet metal having a generally U-shape cross section, the legs of said cross-section being of substantially equal length, and fitted over said trailing edge to embrace and cover the same, the metal of said moulding at the inner leg of its U-shape cross section being notched, said notches extending from the end of the inner leg of the cross section to its connecting portion and terminating before reaching the middle of the curve connecting portion of the U.

References Cited in the file of this patent

UNITED STATES PATENTS

| | | |
|---|---|---|
| 173,916 | Dollard | Feb. 22, 1876 |
| 380,580 | Koenig | Apr. 3, 1888 |
| 2,182,687 | Bailey | Dec. 5, 1939 |
| 2,226,615 | Killen | Dec. 31, 1940 |
| 2,613,720 | Baker | Oct. 14, 1952 |
| 2,685,472 | Adell | Aug. 3, 1954 |

FOREIGN PATENTS

| | | |
|---|---|---|
| 983,890 | France | Feb. 14, 1951 |